United States Patent
Akimoto et al.

(10) Patent No.: US 6,925,125 B2
(45) Date of Patent: Aug. 2, 2005

(54) ENHANCED APERTURE PROBLEM SOLVING METHOD USING DISPLACED CENTER QUADTREE ADAPTIVE PARTITIONING

(76) Inventors: Hiroshi Akimoto, 26, Kitayacho, Nakahara-ku, Kawasaki-shi, Kanagawa-ken, 211-0015 (JP); Fyodor Yu. Kislov, 23-1 Tajiricho, Nakahara-Ku, Kawasaki-shi, Kanagawa-ken (JP), 211-0015

( * ) Notice: Subject to any disclaimer, the term of this patent is extended or adjusted under 35 U.S.C. 154(b) by 384 days.

(21) Appl. No.: 10/338,980

(22) Filed: Jan. 9, 2003

(65) Prior Publication Data

US 2003/0152147 A1 Aug. 14, 2003

Related U.S. Application Data

(60) Provisional application No. 60/347,343, filed on Jan. 9, 2002.

(51) Int. Cl.$^7$ ................................................. H04B 1/66
(52) U.S. Cl. ............................ 375/240.16; 375/240.15; 375/240.14; 375/240.19; 375/240.24; 348/699; 382/238; 382/236; 382/240; 382/248
(58) Field of Search ...................... 375/240.16, 240.15, 375/240.14, 240.19, 240.24; 348/699; 382/238, 236, 240, 248

(56) References Cited

U.S. PATENT DOCUMENTS

| | | | | |
|---|---|---|---|---|
| 5,646,867 A | * | 7/1997 | Ozcelik et al. | 375/240.14 |
| 5,701,160 A | | 12/1997 | Kimura et al. | 348/413 |
| 5,894,526 A | | 4/1999 | Watanabe et al. | 382/236 |
| 5,920,352 A | | 7/1999 | Inoue | 348/384 |
| 5,946,043 A | * | 8/1999 | Lee et al. | 375/240.24 |
| 6,058,210 A | | 5/2000 | de Queiroz et al. | 382/232 |
| 6,169,573 B1 | | 1/2001 | Sampath-Kumar et al. | 348/169 |
| 6,173,077 B1 | | 1/2001 | Trew et al. | 382/236 |
| 6,178,265 B1 | | 1/2001 | Haghighi | 382/236 |
| 6,188,728 B1 | | 2/2001 | Hurst | 375/240.16 |
| 6,188,776 B1 | | 2/2001 | Covell et al. | 382/100 |
| 6,188,798 B1 | | 2/2001 | Lee | 382/251 |
| 6,222,939 B1 | | 4/2001 | Wiskott et al. | 382/209 |
| 6,614,847 B1 | * | 9/2003 | Das et al. | 375/240.16 |

OTHER PUBLICATIONS

Stephan Kruger, Motion Analysis and Estimation using Multiresolution Affine Models, Department of Computer Science, Jul. 1998.

B. Bascle, P. Bouthemy, R. Deriche, and F. Meyer. Tracking complex primitives in an image sequence. Technical Report 2428, INRIA, Sophia–Antipolis, France, Dec. 1994.

* cited by examiner

*Primary Examiner*—Shawn S. An
(74) *Attorney, Agent, or Firm*—Garrison & Associates PS; David L. Garrison

(57) ABSTRACT

The disclosed method provides a new resolution of the aperture problem, which is one of the basic problems present in motion estimation technology. The method constitutes a resolution of this problem by means of adaptive transfer to smaller blocks. The approach consists of adaptive partitioning of the picture with the use of quadratic trees. If an aperture problem is detected in the block, then the block partitions with the help of quadratic trees into smaller blocks. The partitioning continues until either the aperture problem is resolved or the smallest size block is reached. Through the use of this method, the aperture problem is successfully resolved without substantial loss in the degree of compression.

3 Claims, 3 Drawing Sheets

FIG.3A $\varepsilon_A = (e_1+e_2+e_3+e_4)/4$ $\varepsilon_{best} = \min\{\varepsilon_k\};$

FIG.3B $\varepsilon_B = (e_1+3e_2+3e_3+9e_4)/16$ $\varepsilon_{best} = \min\{\varepsilon_k\};$

FIG.3C $\varepsilon_C = (3e_1+e_2+9e_3+3e_4)/16$ $\varepsilon_{best} = \min\{\varepsilon_k\};$

FIG.3D $\varepsilon_D = (9e_1+3e_2+3e_3+e_4)/16$ $\varepsilon_{best} = \min\{\varepsilon_k\};$

FIG.3E $\varepsilon_E = (3e_1+9e_2+e_3+3e_4)/16$ $\varepsilon_{best} = \min\{\varepsilon_k\};$

ENHANCED APERTURE PROBLEM SOLVING METHOD USING DISPLACED CENTER QUADTREE ADAPTIVE PARTITIONING

CROSS-REFERENCE TO RELATED APPLICATION(S)

This application claims priority from U.S. Provisional Patent Application No. 60/347,343, entitled "The Enhanced Aperture Problem Solving Method Using Displaced Center Quadtree Adaptive Partitioning," filed Jan. 9, 2002.

FIELD OF INVENTION

This invention relates generally to low bit rate image coding, and in particular, to motion estimation.

BACKGROUND OF THE INVENTION

Video films are an effective means for describing information about a variety of subject realms and a variety of objects within those subject realms. Current digital transmitting systems have a number of advantages for video processing in comparison with analog systems. Recently developed techniques have led to improved methods to reduce video or image size. Such methods are extremely useful for digital data storing and processing or manipulating. So it may be said that data size reduction is a compression process. The main objective of a compression process is to achieve the highest compression ratio and in the same time to provide the minimum data loss that may lead to decompressed image quality degradation.

Generally, to encode an image sequence, information concerning the motion of objects in a scene from one frame to the next play an important role. Because of the high redundancy that exists between consecutive frames within most image sequences, substantial data compression can be achieved using motion estimation/compensation so that the encoder will only have to encode the differences relative to areas that are shifted with respect to the areas coded. Motion estimation is a process of determining the direction and motion vectors for an area in the current frame relative to one or more reference frames. Motion compensation is a process of using the motion vectors to generate a prediction of the current frame. The difference between the current frame and the predicted frame results in a residual signal, which contains substantially less information than the current frame. Thus a significant saving in coding bits is realized by encoding and transmitting only the residual signal and corresponding motion vectors.

Encoders must address the dichotomy of attempting to increase the precision of the motion estimation process to minimize the residual signal or accepting a lower level of precision in the motion estimation process to minimize the computation overhead. Determining the motion vectors from the frame sequence requires intensive searching between frames to determine the motion information. A more intensive search will generate a more precise set of motion vectors at the expense of more computational cycles.

Some systems determine motion information using a block based approach. In a simple block based approach the current frame is divided into a number of blocks of pixels (current blocks). For each of these current blocks, a search is performed within a selected area in the preceding frame for a block of pixels that best matches the current block (determine the block displacement).

There is a problem inherent in selecting what size of block to use for motion estimation. If the block size is too large, there may bee to much information in the block, thus requiring a relatively large amount of information to adequately describe the motion in the block. If the block size is too small it may be impossible to estimate the block displacement. This problem is called the aperture problem.

Therefore, there is a need for a method for solving the aperture problem by determining the best size and number of blocks to use for motion estimation in a frame.

SUMMARY OF THE INVENTION

This invention relates to motion estimation area and in particular discloses a method and for effectively accounting for motion in different regions of a video frame. Blocks having fixed size and definite form split an encoded video frame. The current invention is a technique of adaptive jumping to blocks having smaller size using different quadro-partitions (displaced center quadtree partitioning). The criterion of the aperture problem presence in a block is predefined. The invention solves the aperture problem by using a displaced center quadtree partitioning approach.

Displacing the quadtree center results in blocks having various linear sizes. The partitioning continues until the aperture problem is solved or the minimum block size is reached. Therefore, the current invention resolves the aperture problem with reasonable compression ratio loss.

BRIEF DESCRIPTION OF THE DRAWINGS

The several objectives and features of the present invention will become more readily apparent from the following detailed description taken in conjunction with the accompanying drawings in which:

FIG. 3 illustrates the partitioning variants and error calculating of an image block.

BEST MODE OF CARRYING OUT THE INVENTION

Figure 1:
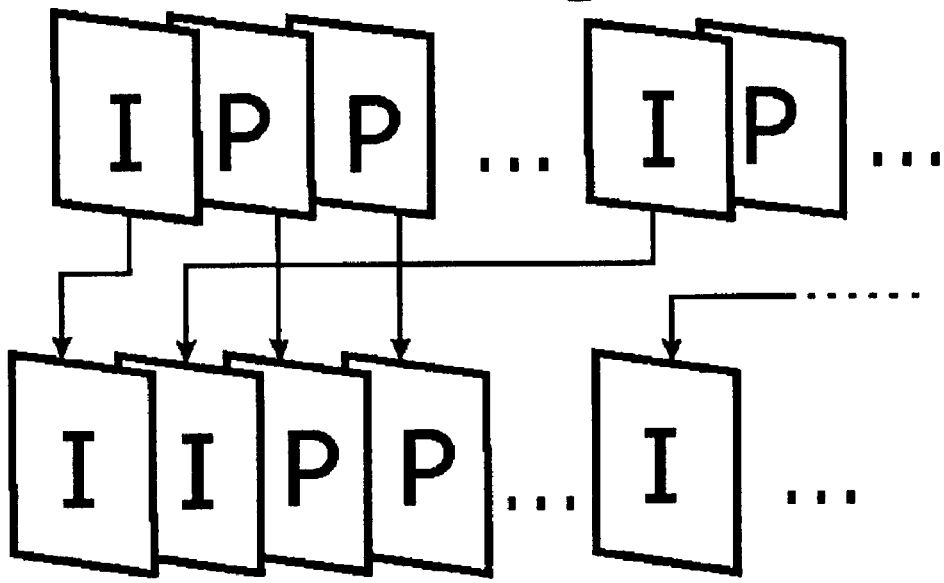
FIG. 1 illustrates the frame sequence in input and output streams.

Turning now to the drawings, the invention will be described in preferred embodiments. It is reasonable to perform a video film as a frame sequence. Each frame in turn is represented by three matrices in which the elements are digital pixel intensity values according to the color plane.

There are a number of color systems; the majority are the RGB model and the YUV model. In the RGB model, color is a combination of red, green, and blue. In the YUV model, color is performed as an intensity—Y and two color-differences—U and V (where U is a difference between red and green intensities and V—between blue and green intensities). The current invention mostly addresses the use of YUV model due to its considerable feature: the most informative is the Y component. The U and V components are much less informative. There are some useful models for frame representation.

In the 4:2:2 model, every intensity value complies a pixel; color differences' values are the same for the neighbor horizontal pixels. The table below shows such a model.

| $Y_1U_1V_1$ | $Y_2U_1V_1$ |
| $Y_3U_2V_2$ | $Y_4U_2V_2$ |

In the 4:2:0 model, every intensity value complies a pixel; color differences' are the same for four neighbor pixels.

| $Y_1U_1V_1$ | $Y_2U_1V_1$ |
| $Y_3U_1V_1$ | $Y_4U_1V_1$ |

The method disclosed herein generally uses the 4:2:2 model. Therefore, the frame sequence is described as a plurality of matrices defining the pixels' colors.

Frame quantity per second may vary. Modern video processing systems frame frequency was taken from outdated analog TV standards. In Europe, the standard frequency is 25 Hertz (frames per second) based on PAL and SECAM standards. In the USA and Japan, frequency is 29.97 Hertz according to NTSC standard. Frame size is based on that standard as well, so it is 720×576 or 720×486 or divisible by them (360×288, 180×144 and so on).

Most motion estimation algorithms are based on an important characteristic feature: images captured by a video camera change a little during $\frac{1}{25}$ or $\frac{1}{30}$ of a second, so that algorithms are to compress indeed video films but not the random image sequence. Motion estimation techniques help avoid and informational redundancy.

The current frame is the frame encoding in the present moment of time. The current frame is encoded relative to reference frames. Therefore, information from the reference frames is used to encode the current one.

The backward-reference frame is a reference frame appearing before the current frame during restoration. The forward-reference frame is a frame that restores later then the current frame. The predicted frame is a frame restored on the base of a decompression algorithm used during encoding but not restoration.

It is clear that there might be frames encoded without any information from other frames. Such frames are called intra frames. The need for intra frames is conditioned by, for instance, changes in a video scene or the need to isolate a starting point for video film decoding.

It is not reasonable to operate the whole frame during encoding due to movement in parts of the frame. Some parts may be sufficiently hard to describe because of their complete displacements or other changes. That is why blocks are used—image parts having definite form (usually square or rectangular blocks). Therefore, one can say that the information changing in a frame relative to reference frames is the totality of all the changes in all the blocks, which completely cover the frame.

There is a problem relating to the selection of block size. That problem is called the aperture problem. If one chooses an overly large block size, some parts of the objects in that block might move in different ways, i.e., at different directions, or at different speeds. Therefore, it is hard to describe the movement in the whole block. If one chooses a block size that is too small, there may not be enough information to estimate block displacement and to find the suitable block from the reference frame. Additionally, there is a compression ratio loss due to small block size.

The method disclosed herein addresses the task of recognizing and solving the aperture problem. The method allows the aperture problem to be solved more effectively by selecting partitioning variants to provide the best solution. Non-overlapping blocks are used and the average error is calculated in accordance with the block-partitioning variant.

The main procedure of the current invention is a high-level procedure that executes the film encoding process. Two external procedures must be pre-defined. These two external procedures are frame encoding using wavelet transform and entropy encoding. Local data and input parameters for the main procedure are shown in the tables below

TABLE 1

Local data.

| Current_Frame_number | Variable which stores the current frame number |
| Out | Auxiliary buffer for storing motion vectors |
| e_out | Auxiliary buffer for storing entropy encoding results |
| Cur | Current frame. |

TABLE 2

Input parameters.

| Is | Input frame stream |
| I_dist | Frame quantity between the closest intra frames |
| Max_block | Maximum block size |
| Min_block | Minimum block size |
| Range | Range of searching |
| Tr | Maximum error value for the found block (threshold) |
| Os | Output stream. |

The procedure is then executed according to the steps below.

Step 1. Get the first frame from input stream, so that frame is the current one (cur).

Step 2. Encode the current frame using wavelet transform algorithm. That frame will be a backward-reference after decoding.

Step 3. Write out to os. FIG. 1 illustrates step 3.

Step 4. Get I_dist frame from is. I_dist is cur.

Step 5. Encode cur using wavelet-transform algorithm. After decoding cur will be used as forward-reference frame.

Step 6. Write to os intra-frame's (I-frame's) header.

Step 7. Get all frames up to the next intra-frame from input stream and encode them.

Step 8. Call the motion_estimation procedure for the regular frame (cur) and record the result to out.

Step 8a. Encode out buffer contents using entropy encoding.

Step 8b. Record B-frame header to output stream, and write e_out into os.

Step 9. Establish the forward-reference as a backward-reference.

Step 10. Get current_frame_number and I_dist frame from is and set it as a current frame (cur) then encode it using wavelet transform, establish cur as a backward-reference frame.

Step 11. Record I-frame header to os.

Step 12. Repeat steps 7–12 while the input stream contains frames.

A motion estimation (motion_estimation) procedure is used to encode the motion vectors of non-intra-frames relative to current reference frames perform non-intra-frame code. Input data, input parameters, and output parameters for the procedure are shown in Table 3, Table 4, and Table 5 below.

TABLE 3

Input data.

| | |
|---|---|
| X | Current block's X coordinate |
| Y | Current block's Y coordinate |

TABLE 4

Input parameters.

| | |
|---|---|
| Cur | Current frame |
| Bck | Backward-reference |
| Fwd | Forward-reference |
| Max_block | Maximum block size |
| Min_block | Minimum block size |
| Range | Searching range |
| Tr | Maximum error value for the found block (threshold) |
| Width | Pixels quantity across (horizontal resolution) |
| Height | Pixels quantity upright (vertical resolution) |
| Out | Output Buffer |

The procedure is then executed according to the following steps.

Step 1. Partition the frame into blocks having a predefined size.

Step 2. Call the cover_block procedure (described below) for every block.

Figure 2A:
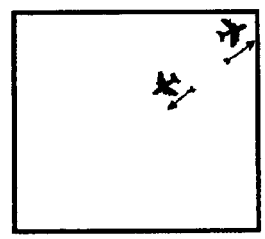
FIG. 2 illustrates an example of the adaptive image partitioning by blocks.
Figure 2B:
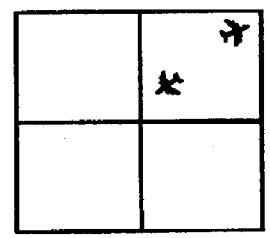
Figure 2C:
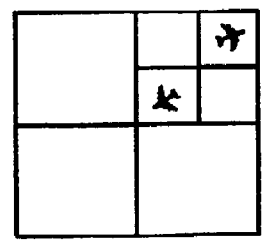

The cover_procedure performs motion estimation for a block during execution of the motion_estimation procedure. If necessary, a block is partitioned by four smaller blocks using displacement center quadtree partitioning. (FIG. 2 illustrates the image adaptive partitioning example.)

After the first frame is partitioned, there is a check to determine if any of the blocks can forego further partitioning. If the error value is higher than a predefined threshold, further partitioning is needed.

Five partitioning variants, relative to the motion character in the block, are performed. (FIG. 3 illustrates all the variants.)

The average error for all of the variants is calculated as follows:

$$\epsilon_A = (e_1+e_2+e_3+e_4)/4; \quad\quad 1.$$

$$\epsilon_B = (e_1+3e_2+3e_3+9e_4)/16; \quad\quad 2.$$

$$\epsilon_C = (3e_1+e_2+9e_3+3e_4)/16; \quad\quad 3.$$

$$\epsilon_D = (9e_1+3e_2+3e_3+e_4)/16; \quad\quad 4.$$

$$\epsilon_E = (3e_1+9e_2+e_3+3e_4)/16; \quad\quad 5.$$

Figure 4:
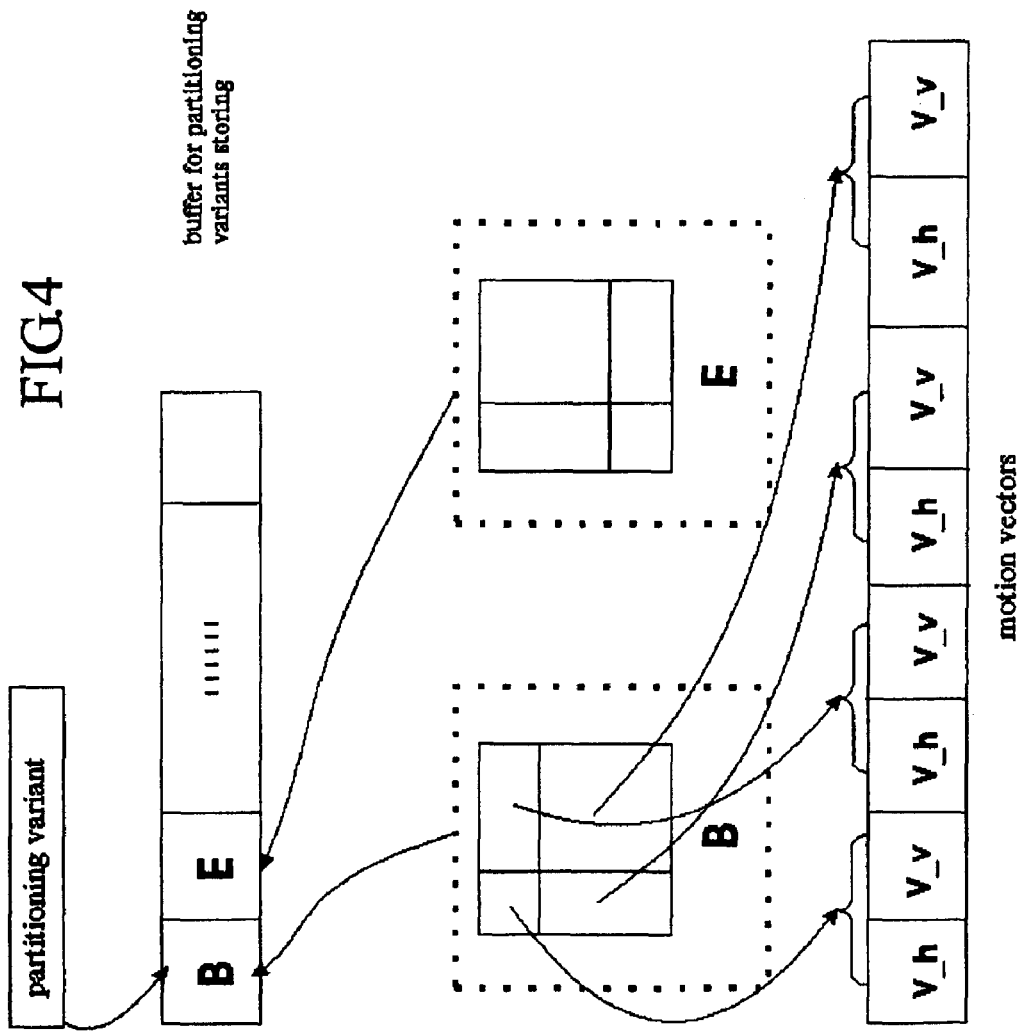
FIG. 4 is a partitioning variant and the displacement vectors of a sub-block recorded to the output stream.

The general form is:

$$\varepsilon_k = \frac{\sum_{i=1}^{4} a_i \cdot e_i}{\sum_{i=1}^{4} a_i},$$

where $\alpha_i$ are the weights, $$\epsilon_{best} = \min\{\epsilon_k\};$$

is a number of splitting variant varies from 1 to 5. From $\epsilon_k$ we choose the minimum one:

If the predefined aperture problem criterion has been reached, the partitioning for the given block is chosen and the horizontal and vertical motion vector components are recorded to output streams. FIG. 4 shows the order of their recording. If not, the call cover_block procedure is ran recursively for all the blocks using the best partitioning variant until the criterion is reached.

If the error value exceeds the threshold value (tr), the block is partitioned into four smaller parts. Otherwise, the direction, horizontal and vertical motion components are recorded to output stream. The input parameters and the output parameters for the cover_block procedure are shown in Table 6 and Table 7 below.

TABLE 6

Input parameters.

| | |
|---|---|
| Cur | Current block |
| Bck | Backward-reference |
| Fwd | Forward-reference |
| Block_size | Block size |
| Min_block | Minimum block size |
| Range | Range of searching |
| Tr | Maximum error value for the found block (threshold) |
| x, y | Current block's coordinates |

TABLE 7

Output parameters.

| | |
|---|---|
| Out | Output Buffer |

The cover_block procedure is executed according to the following steps.

Step 1. Call the find_best procedure. ct=find_best.
Step 2. If ct>tr
   if block_size>min_block
then
   Block_size is partitioned relative to the chosen variant.
   Call cover_block for the block having new coordinates.
   Record 0 to out.
Else
   To record dir and v_h, v_v to out.
   (v_h, v_v (from table 9) are calculated in find_best procedure.)
Step 3. Exit.

The find_best procedure searches for the most suitable block size for the current one in the reference frames. The search is bounded by range. The input and output parameters for the find best procedure can be seen in Tables 8 and 9 below.

TABLE 8

Input parameters.

| | |
|---|---|
| Cur | Current block |
| Bck | Backward-reference |
| Fwd | Forward-reference |
| Block_size | Block size |
| Range | Searching range |

TABLE 9

Output parameters.

| | |
|---|---|
| Dir | Direction (back, fwd) |
| V_h | Horizontal motion component |
| V_v | Vertical motion component |
| Ct | The best error value |

Step 1. Assign ct an a fortiori high number.
Step 2. Get the block having x+i and y+j coordinates from bck frame according to range.
Step 2a. Execute step from get_dist procedure for the obtained block and the current one (for which we look for the best one).
If result get_dist<ct, assign
ct=get_dist;
v_h=i;
v_v=j;
dir=bck;
get block having x+i and y+j coordinates from fwd frame.
Determine the distance between obtained block from bck and the current block cur, i.e. to call get_dist procedure.
If get_dist result is less then ct
Then assign ct get_dist.
Horizontal displacement is v_h=i;
Vertical displacement is v_v=j;
dir=fwd.

Repeat Step 2a for every i, j∈[−range; +range].

Step 3. Return ct, v_h, v_v, dir.

To calculate the average distance between the current and reference blocks, the get_dist procedure is used.

The procedure returns the average linear distance (dist) for two blocks. That distance is essential for error calculating. The input and output parameters for the get_dist procedure can be seen in Table 10 and Table 11 below.

TABLE 10

Input parameters.

| | |
|---|---|
| Cur | Current block |
| Ref | Reference block |
| Size_x | Block width |

TABLE 10-continued

Input parameters.

| | |
|---|---|
| Size_y | Block height |

TABLE 11

Output parameters.

| | |
|---|---|
| Dist | The distance between blocks |

The distance between blocks is calculated according to Equation 1.
Step 1. dist=0.
Step 2. For every pixel of the block dist=dist+|cur[j]−ref[j]|. cur[j] and ref[j] are current pixels' intensities. cur[j] is an intensity for a pixel from the current block and ref[j] is an intensity for a pixel from the reference frame.
Step 3. dist=dist/(size_x·size_y).

Equation 1:

$$\frac{\sum_{j=0}^{j(x\_size \cdot y\_size)} |cur[j] - ref[j]|}{x\_size \cdot y\_size}$$

The current invention discloses methods and procedures that execute a video film encoding process. The methods and procedures disclosed in the current application can be executed or preformed in a computer, other microprocessors, programmable electronic devices or other electronic circuitry that are used for encoding video film. They can be loaded into the above devices as software, hardware, or firmware. They can be implemented and programmed as discrete operations or as a part of a larger video compression strategy.

INDUSTRIAL APPLICABILITY

The invention has applicability to the field of video compression, in particular, this invention describes a method for solving the aperture problem by successively partitioning blocks in a video frame. In compliance with the statute, the invention has been described in language more or less specific as to the given method. It is to be understood, however, that the invention is not limited to the specific features shown or described, since the means and construction shown or described comprise preferred forms of putting the invention into effect. Additionally, while this invention is described in terms of being used in the field of video compression, it will be readily apparent to those skilled in the art that the invention can be adapted to other uses as well. The invention is therefore, claimed in any of its forms or modifications within the legitimate and valid scope of the appended claims, appropriately interpreted in accordance with the doctrine of equivalents.

What is claimed is:

1. A method for effectively accounting for motion in different regions of a video frame during the encoding, for compression, of a sequence of image frames on a video film, comprising the steps of:
   a) selecting the first frame from the input stream of image frames;

b) encoding the first frame using a wavelet transform algorithm;

c) recording information about the encoded first frame such that it can be used as backward reference frame during restoration of the video film;

d) selecting the next intra-frame from the sequence of image frames;

e) encoding the infra frame using a wavelet-transform algorithm;

f) recording information about the encoded intra-frame such that it can be used as forward reference frame during restoration of the video film;

g) encoding the non-intra-frames between the forward reference frame and the backward reference frame;

h) determining the motion vectors of the non-intra-frames;

i) encoding the motion vectors of the non-intra-frames;

j) recording the encoded motion vectors in a motion vector storage buffer;

k) encoding the contents of the motion vector storage buffer using entropy encoding;

l) recording B-frame header to the out put stream;

m) recording entropy encoding results in a buffer;

n) establishing the forward-reference as a backward-reference;

o) selecting the next intra-frame from the sequence of image frames;

p) encoding the intra-frame using a wavelet-transform algorithm;

q) recording information about the encoded intra-frame such that it can be used as backward reference frame during restoration of the video film; and r) repeating steps g-r while the input stream contains frames.

2. The method of claim 1 wherein the motion vectors are determined by repeatedly partitioning a video frame into a plurality of blocks of pixels until the best possible block size for determining the motion vectors is reached.

3. The method of claim 2 wherein after the initial partitioning of a video frame into blocks of pixels, the error values is compared to a pre-determined threshold to determine if any of the blocks can forgo further partitioning.

* * * * *